April 10, 1951
A. E. GEALT
2,548,014
ELECTRONIC MOTOR CONTROL APPARATUS WITH
SEPARATE NULL INDICATING DEVICE
Filed June 16, 1949
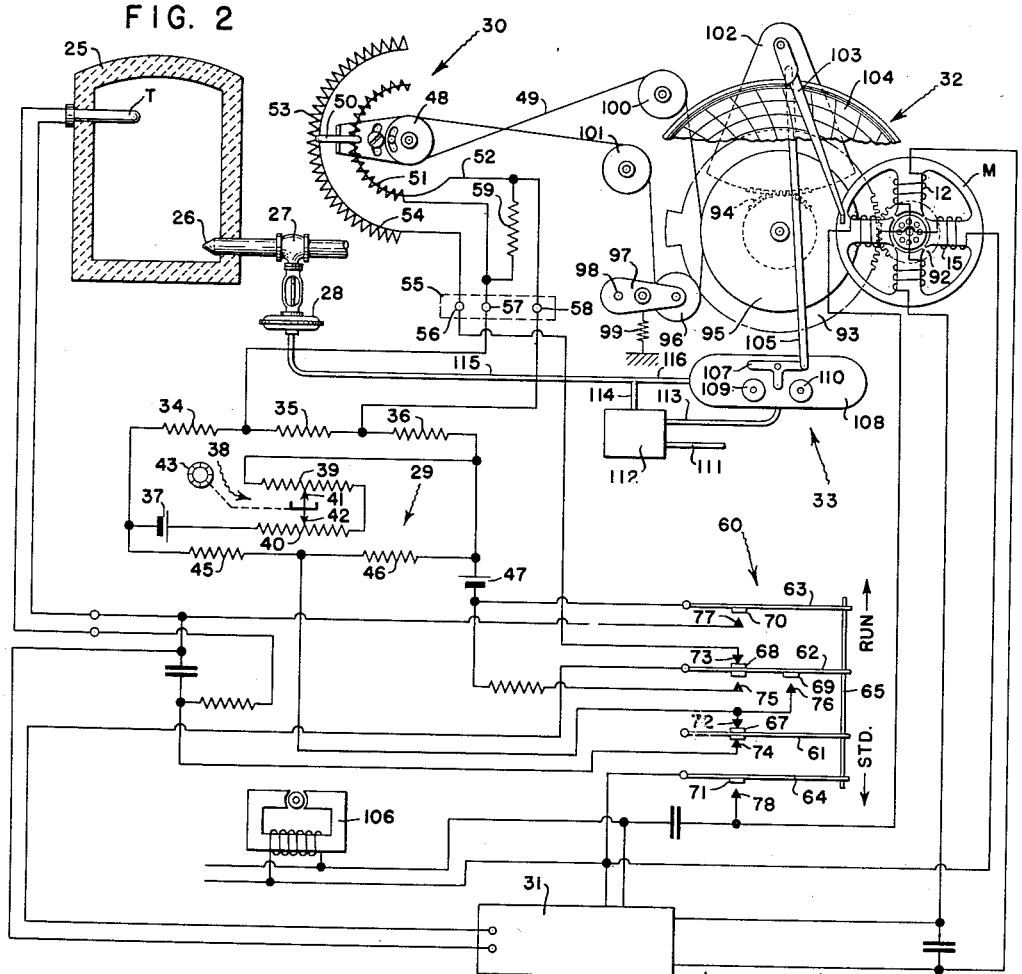
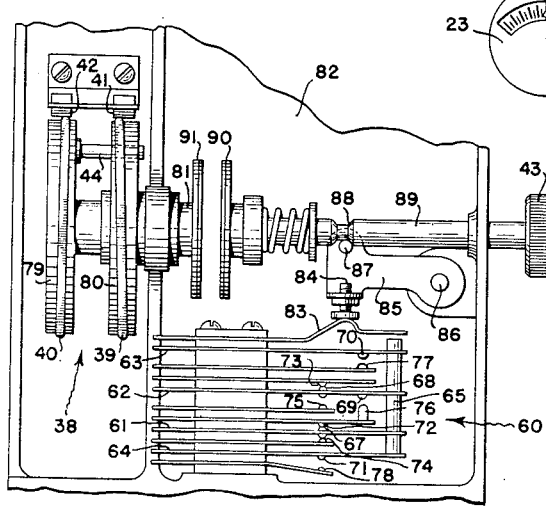
INVENTOR.
ARTHUR E. GEALT
BY
Arthur H. Swanson
ATTORNEY.

Patented Apr. 10, 1951

2,548,014

UNITED STATES PATENT OFFICE 2,548,014

ELECTRONIC MOTOR CONTROL APPARATUS WITH SEPARATE NULL INDICATING DEVICE

Arthur E. Gealt, Philadelphia, Pa., assignor to Minneapolis-Honeywell Regulator Company, Minneapolis, Minn., a corporation of Delaware Application June 16, 1949, Serial No. 99,408

12 Claims. (Cl. 318—29)

The present invention relates to motor control apparatus of known type including a motor having a motor energizing circuit means connected to the output circuits of two electronic motor drive valves, each of which includes an anode, a cathode, and a control electrode, and an electronic amplifier connected to the control electrodes of said valves and operating to make one of said valves more or less conductive than the other in response to the departure in one direction or the other from a normal or zero value of a control signal amplified by said amplifier.

A general object of the invention is to provide new and improved means for indicating the departure and direction of departure of said control signal from is normal or zero value under certain conditions in which the operation of the motor cannot be observed or in which other operating conditions require or make desirable the effective disconnection of the motor energizing circuit means from the output circuits of the motor drive valves, or involving the dynamic testing of the motor to determine its torque and speed characteristics with varying degrees of departure of the control signal from its normal or zero value.

The invention may be used with especial advantage in connection with the recalibration or standardization of potentiametric instruments of the self-balancing type for measuring and utilizing for control and analogous purposes minute direct current potentials such, for example, as those derived from thermocouples or from photovoltaic or hydrogen ion cells. It is customary in measuring and controlling instruments of this type to provide a battery or dry cell for energizing the measuring circuit to produce a voltage of known magnitude to which the thermocouple or other voltage under measurement is compared. Because of the tendency of the voltage output of batteries to decrease or change with age, use and fluctuations in the ambient temperature to which they are subjected, it is necessary or desirable from the standpoint of maintaining measuring and controlling accuracy periodically to check the voltage of the battery and to effect a compensating adjustment of the measuring circuit for such changes in battery voltage as may have occurred so as to maintain the voltage of known magnitude at a substantially constant value. Such a compensating adjustment is known in the art as a recalibrating or standardizing adjustment and ordinarily is accomplished by disconnecting the thermocouple from the measuring circuit and by comparing the known voltage to the voltage of a standard cell from which little or no current is drawn during the compensating operation and which provides a substantially constant voltage throughout its useful life.

The need for such compensating provisions is especially apparent in potentiometric measuring and controlling instruments of the so-called narrow span type. By a narrow span potentiometric instrument is meant one which is so designed that the range of measurement is small and highly suppressed, for example, from 900° F. to 1000° F., as compared with a range of 0° F. to 1000° F. or greater in potentiometric instruments of ordinary span.

In many control applications for which such narrow span potentiometric instruments are especially applicable, it is imperative for the recalibrating or standardizing adjustments of the potentiometric measuring circuit to be made without effecting momentary, false adjustments of the final control element which tend to occur in the prior art instruments as a direct result of the recalibrating operations. The difficulty with the prior art measuring and controlling instruments in this connection is that the valve controlling the supply of fuel to an oil-fired high temperature furnace, for example, may be given rapid closing and opening adjustments during the standardizing operation and as a direct result of that operation. In such event, the resulting squirting of the fuel oil into the hot furnace may cause a big, explosive puff. The furnace flame may be extinguished by this puff, or, where safety devices responsive to the presence or absence of the flame are provided, the safety device may cause the fuel valve to close. Such closure of the fuel valve is undesirable because of the interruption of the process and also because of the attendant difficulties due to the necessity of reopening the fuel valve and resetting the safety device.

A specific object of the present invention is to provide an interlock between the recalibrating mechanism of the potentiometric measuring circuit and the motor energizing circuit means of the potentiometric rebalancing means for preventing operation of the rebalancing motor during the recalibrating operation so that the potentiometric measuring apparatus is made inoperative to change the position of the final control element during recalibrating operations. A more specific object of the invention is to provide simple and efficient means in association with such apparatus for indicating the changes and the direction of the changes which have occurred in the battery voltage subsequent to the last recalibrating adjustment. In accordance with the present invention, such indication is utilized as indicating the necessity for a recalibrating adjustment and the extent of the recalibrating adjustment required.

The present invention may also be used to advantage in connection with the dynamic testing of motors such as the rebalancing motor of the potentiometric measuring apparatus hereinbefore described. Thus, the indicating means provided in association with the motor drive valves may be employed to provide a measure of the torque and speed characteristics of the motor with control signals of different magnitude and phase applied to the control electrodes of the motor drive valves. In making such dynamic tests of the motor, it is customary to load the output shaft of the motor or otherwise interfere with its free rotation and in making such measurements, therefore, it is impossible to employ the rotation of the motor shaft as a measure of the character of the control signal.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 1 illustrates a motor control arrangement embodying the principles of the present invention;

Fig. 2 is a circuit diagram illustrating the use of the motor control arrangement of Fig. 1 in a rebalancing potentiometric measuring and controlling apparatus; and Fig. 3 is a side elevation of one practical form of the standardizing switch and calibrating rheostat of the potentiometric measuring apparatus of Fig. 2.

In Fig. 1, a transformer 1 supplies energizing current to a motor energizing circuit means which may well be, and is shown as being, of the general type disclosed and claimed in the Wills Patent 2,423,540 granted July 8, 1947. As diagrammatically shown, the transformer 1 comprises a primary winding 2 having its terminals connected to alternating current supply conductors L' and L² adapted to supply alternating current of conventional frequency and voltage: for example, 60 cycles per second and 115 volts. The transformer also includes two secondary windings, respectively designated by the numerals 3 and 4. The secondary winding 3 has one end terminal connected to the anode of a triode 5 and has its other end terminal connected to the anode of a second triode 6. The triodes 5 and 6 may well be the two triodes included in a twin tube of the commercially available 7N7 type. The cathode of the triode valve 5 is connected through an adjustable resistor 7 and a fixed resistor 8 to a grounded conductor 9. The cathode of the triode 6 is connected through fixed resistors 10 and 11 to the grounded conductor 9. The latter conductor is connected through the control winding 12 of a motor M to the mid-point of the secondary winding 3 through a center tap 13. A condenser 14 in parallel with the winding 12 cooperates with the latter to form a parallel resonant circuit.

The power winding 15 of the motor M is connected across the supply conductors L' and L², in series with a condenser 16 to form a series resonant circuit. The motor M is of conventional rotating field type, and the control winding 12 and the power winding 15 cooperate to create a motor field which rotates in one direction or in the opposite direction, depending upon the phase of the control signal impressed on the control electrodes of the valves 5 and 6.

The control electrodes of the valves 5 and 6 are connected to one another and are coupled through a condenser 17 to a terminal 18 which, together with a terminal 19, forms the pair of input terminals to which the control signal is adapted to be applied. The terminal 19 is connected directly to the grounded conductor 9 and is connected by a fixed resistor 20 to the control electrodes of the valves 5 and 6.

In accordance with the present invention, the fixed resistors 8 and 11 are each shunted by an individual condenser 21 and 22, respectively, and a meter 23 and a resistor 24 are connected in series with each other between the terminals of the condensers 21 and 22 which are remote from the grounded conductor 9. The meter 23 is of known type and, for example, may comprise a milliammeter.

In the intended operation of the apparatus shown in Fig. 1, the resistors 7 and 8 in the cathode circuit of the valve 5 and the resistors 10 and 11 in the cathode circuit of the valve 6 serve as biasing resistors to provide cathode bias voltage for the associated valves 5 and 6, respectively. The condenser 21 in shunt to the resistor 8 and the condenser 22 in shunt to the resistor 11 serve to smooth out any fluctuations or ripple in the voltage drop which may be produced across the resistors 8 and 11 as cathode current flows through said resistors.

Suitable and suitably related values of the circuit components shown in Fig. 1 are as follows:

Resistor 7—750 ohms
Resistor 8—50 ohms
Resistor 10—500 ohms
Resistor 11—50 ohms
Resistor 24—10,000 ohms
Condenser 21—20 microfarads
Condenser 22—20 microfarads It is noted that the resistors 8 and 11 are each of the same value: namely, 50 ohms. Consequently, when the current in the cathode circuit of the triode 5 is equal in magnitude to that of the triode 6, the voltage drops produced across the resistors 8 and 11 will be identical. That condition of identity will be indicated by a zero or undeflected reading of the milliammeter 23. In other words, when the voltage drops across the resistors 8 and 11 are equal, the potential of the junction of resistor 8 and the condenser 21 will be the same as the potential of the junction of the resistor 11 and the condenser 22 and no current will then flow through the milliammeter 23. This condition of zero current flow through the milliammeter 23 can occur only for the operation of the valves 5 and 6 in which both valves are equally conductive during the alternate half cycles of the alternating voltage provided by the supply conductors L' and L² in which they are permitted to conduct. Zero current flow through the milliammeter 23 thus indicates that zero control signal is applied to the terminals 18 and 19.

When a control signal of one phase with respect to the supply conductors L' and L² is applied to the control electrodes of the valves 5 and 6, one valve or the other, depending upon the phase of the control signal, will be made more conductive than the other by an amount depending upon the amplitude of the control signal. As a consequence of valves 5 and 6 being differently conductive, the voltage drop produced across resistor 8 by the flow of current in the cathode circuit of valve 5 will be made different from the voltage drop produced across the resistor 11 by the flow of current in the cathode circuit of the valve 6. For example, when valve 5 is more conductive than valve 6, the voltage drop produced across resistor 8 will be greater than that produced across resistor 11 and vice versa.

As a result of the inequality in the voltage drops across the resistors 8 and 11, a current will be established through the milliammeter 23 in one direction or the other accordingly as the voltage drop across the resistor 8 is larger or smaller than the voltage drop across the resistor 11. The direction of deflection of the indicating pointer of the milliammeter 23, therefore, will provide an indication of which valve 5 or 6 is more conductive, and, consequently, an indication of the phase of the control signal applied to the terminals 18 and 19. The extent of deflection or departure of the indicating pointer of the milliammeter 23 from its zero or normal position will be indicative of the extent to which one valve 5 or 6 is made more conductive than the other, and, accordingly, is indicative of the amplitude of the control signal applied to the input terminals 18 and 19.

With this arrangement, therefore, the deflection of the milliammeter 23 may be utilized to indicate whether a control signal is applied to the terminals 18 and 19 and to indicate the phase and amplitude of the control signal that is applied to those terminals.

For the purpose of compensating for differences in the conductivities of the valves 5 and 6 which may exist for the condition of zero control signal applied to their control electrodes, the resistor 7 is made adjustable. Thus, with zero control signal applied to the terminals 18 and 19, the resistor 7 is adjusted until the milliammeter 23 indicates the condition of zero current flow through it which exists only when the voltage drop across the resistor 8 is exactly the same as that produced across resistor 11.

As is shown in Fig. 1, the control winding 12 of the motor M is connected in a circuit which is common to both cathode circuits of the valves 5 and 6. Thus, when zero control signal is applied to the input terminals 18 and 19 and the milliammeter 23 indicates a zero reading, the frequencies of the voltage and current in the control winding 12 are double the supply voltage frequency. In other words, a pulse of current will then flow through the motor winding 12 during each half of the supply voltage wave, which pulses are of substantially equal magnitude. For this condition of operation, the rotor of the motor M is not energized for rotation in either direction, and accordingly, the motor rotor remains stationary.

When a control signal is applied to the input terminals 18 and 19, the current pulses delivered to the motor winding 12 during one half cycle of the supply voltage will be larger or smaller than the current pulses delivered to that winding during the other half cycle according to the phase of the control signal. In consequence of this difference in the current pulses during the opposite half cycles in the motor winding 12, the current flow in the local circuit including the motor winding 12 and its associated condenser will include an alternating current component of the same frequency as that of the supply voltage. That alternating current component of voltage is operative to establish in the magnetic circuit of the motor M a magnetic field which reacts with the magnetic field produced by the current flow in the motor winding 15 to establish a magnetic field in the motor which rotates in one direction or the other, depending upon the phase of the said alternating voltage component in the winding 12 with respect to the supply voltage.

The amplitude of the alternating current component of voltage so produced in the motor winding 12, and which is effective to effect motor rotation, is variable over an operating range in accordance with the amplitude of the control signal applied to the input terminals 18 and 19. As the amplitude of the control signal is increased, the deflection of the indicating pointer of the milliammeter 23 is correspondingly increased, thereby to provide a measure of the amplitude of the control signal.

It is apparent, therefore, that the motor control arrangement shown in Fig. 1 may be utilized in making dynamic tests on the motor M and, for example, may be utilized in determining the torque and speed characteristics of the motor with different control signals applied to the input terminals 18 and 19.

In Figs. 2 and 3, I have illustrated another use of the motor control arrangement shown in Fig. 1 and in particular, the use thereof in a rebalancing potentiometric measuring apparatus. The potentiometric rebalancing apparatus shown in Figs. 2 and 3 may be utilized for measuring, indicating, recording and controlling the value of a variable condition: for example, the temperature within a furnace 25. Furnace 25 may be heated by a burner 26 controlled by a valve 27 operated by an air operated motor 28.

A thermocouple T responsive to the temperature within the furnace 25 operates in conjunction with a potentiometric network, generally designated by the reference numeral 29, and a slidewire assembly, generally designated 30, to form a self-balancing potentiometer instrument. Upon a change in temperature within the furnace 25, an unbalanced direct current voltage is produced in one direction or the other depending upon the sense of unbalance of the potentiometric network 29. The unbalanced direct current voltage so derived is impressed upon the input circuit of an electronic device 31. The motor drive arrangement including the electronic valves 5 and 6 shown in Fig. 1 comprises the output portion of the electronic device 31. The input portion of the electronic device 31 includes a vibrator or equivalent device, an input transformer, and a suitable voltage amplifier, the output circuit of which is connected to the input circuit of the electronic valves 5 and 6. The vibrator, input transformer and voltage amplifier of the electronic device 31 preferably are of the type disclosed in the aforementioned Wills Patent 2,423,540.

The unbalanced direct current voltage derived from the potentiometric network 29 is translated by the vibrator into a pulsating current of one polarity or the opposite polarity depending upon the sense of unbalance of the potentiometric network. This pulsating current is converted into an alternating current by the input transformer, which alternating current is amplified by the voltage amplifier. The amplified output of the voltage amplifier is applied to the input terminals 18 and 19 of the motor drive valve arrangement as shown in Fig. 1 and operates through that arrangement to control the energization of the reversible motor M for rotation in one direction or the other. The motor M operates a driving mechanism, generally designated 32, and rotates in one direction or the other, depending upon the direction of unbalance of the potentiometric network 29. The drive mechanism 32 operates the slidewire assembly 30 to rebalance the potentiometric network and also operates indicating and recording means for indicating and recording the temperature existing within the furnace 25. The drive mechanism 32 also is arranged to operate a controller, generally designated at 33, which may take the form of an air-operated controller such as is illustrated in Patent 2,125,081, granted July 26, 1938, to C. B. Moore. This controller 33 is operatively connected to the valve 27 and adjusts the latter as required to maintain the temperature within the furnace 25 at the desired, normal value.

As shown, the potentiometric network 29 includes three resistors 34, 35 and 36 connected in series. These resistors are preferably formed of manganin wire having a substantially zero temperature coefficient of resistance and are employed for calibrating purposes. A battery 37, which may be a dry cell, is connected in series with a dual vernier rheostat, indicated at 38, in a branch in the potentiometric network 29 which is parallel to that including the resistors 34, 35 and 36. The rheostat 38, as shown, includes movable resistors 39 and 40 and electrically-connected stationary contacts 41 and 42, respectively associated with the resistors 39 and 40. The rheostat 38 is arranged for manual adjustment by means of the manipulation of a knob 43. The knob 43 is arranged for direct manual connection to the movable resistor 40 and is arranged for mechanical connection to the movable resistor 39 through a lost motion mechanism including a pin 44 so that upon initial movement of the knob 43, the resistor 40 is first moved and then the resistor 39 is moved, thereby providing a fine and a coarse adjustment of the rheostat 38. The construction and operation of the rheostat 38 is explained in greater detail in connection with Fig. 3.

The potentiometric network 29 includes a second branch which is connected in parallel with that including the resistors 34, 35 and 36. That second branch includes series connected resistors 45 and 46. Resistor 45 is preferably made of copper or other material having a positive temperature coefficient of resistance. Resistor 46 may be formed of manganin having a substantially zero temperature coefficient of resistance. The resistor 45 operates to compensate for changes in ambient temperature at the cold junctions of the thermocouple T in a manner well known in the art. The resistor 46 is utilized primarily for standardizing or recalibrating purposes and its value is so selected that the voltage drop across it is equal to the voltage produced by a standard cell indicated by the numeral 47.

The slidewire assembly 30 includes a cable drum 48 which is rotated by the drive mechanism 32 through a cable 49. The cable 49 may be made of wire, violin string, rope or cord. The cable drum 48 operates through an adjustable connection to move a slidable contact 50 along a slidewire resistance 51. The resistance 51 comprises resistance wire suitably space wound on an insulated core 52. The resistance 51 and core 52 preferably are formed of material, such as manganin, having a zero temperature coefficient of resistance. The slidable contact 50 also engages a collector bar in the form of a resistance wire 53 space wound on a core 54 and completely electrically conductive with respect thereto throughout their lengths. The resistance wire 53 and core 54 are formed of the same material, such as manganin wire, as the resistance 51 and core 52. The slidewire assembly is provided with a terminal block 55 having terminals 56, 57 and 58. The collector bar 54 is connected to the terminal 56. One end of the resistance wire 51 is connected to the terminal 57 and one end of the core 52 is connected to the terminal 58. The other ends of the resistance 51 and the core 52 are connected together. A resistor 59, also formed of manganin wire, is connected between the terminals 57 and 58 and hence, shunts the resistance 51. The terminals 57 and 58 are connected to opposite ends of the resistor 35 in the potentiometric network 29, whereby the slidewire resistor 51, the resistor 59 and the resistor 35 are all connected in parallel.

A two-position switch, generally designated by the reference numeral 60, is provided for accomplishing two functions: specifically, for adjusting the potentiometric network 29 into its normal operating condition and for adjusting the potentiometric network into its standardizing or recalibrating condition. As shown, the switch 60 includes switch arms 61, 62, 63 and 64 which are electrically insulated from each other and all of which are movable by a common operating member 65. The switch arms 61 and 62 carry contacts 67 and 68, respectively. The switch arm 62 carries an additional contact 69 and the switch arm 63 carries a contact 70. The switch arm 64 carries a contact 71.

In the normal operating or running condition, the switch arms 61 through 64 are in the position shown in Figs. 2 and 3 wherein the contacts 67 and 68 respectively engage relatively stationary contacts 72 and 73 and the contact 67 also engages a movable contact 74.

In the standardizing position of the switch 60, the contacts 67, 68, 69, 70 and 71 respectively engage contacts 74, 75, 76, 77 and 78. When the switch 60 is moved to its standardizing position, the contacts 67 and 68 disengage from their respectively associated contacts 72 and 73.

One form of mechanism which may be employed for adjusting the switch 60 from its normal running position to its standardizing position is illustrated in Fig. 3. As shown in Fig. 3, that mechanism is adjustably associated with the vernier rheostat 38 and the knob 43 for simultaneously adjusting the switch 60 into its standardizing position and for bringing the knob 43 into operative relation with the vernier rheostat 38 for adjusting the latter.

The vernier rheostat 38, as hereinbefore noted, includes a fine adjustment consisting of a fine resistance 40 and a coarse adjustment consisting of a coarse resistance 39. The resistors 40 and 39 are respectively wound on associated discs 79 and 80, desirably made of insulating material, and mounted on a shaft 81. The disc 79 is rigid with the shaft 81, and, therefore, rotates directly with that shaft. The disc 80 is connected to the shaft 81 through a lost motion connection including the pin 44 and a slot in the disc 80 so that the disc 80 effectively is rotated by the disc 79 when the pin 44 engages the extreme ends of said slot. Thus, the fine resistance 40 is adjusted directly by the shaft 81 and the coarse resistance 39 is adjusted by the fine resistance through the lost motion connection including the pin 44. The resistors 40 and 39 are engaged by the electrically connected contacts 42 and 41 which serve the purpose of shunting out more or less of the resistances 40 and 39 from the potentiometric branch including the battery 37 as the shaft 81 is rotated. By their frictional engagement with the resistors 40 and 39, the contacts 42 and 41 serve also to prevent accidental rotation of the resistors 40 and 39.

As shown, the rheostat 38, the knob 43, the shaft 81 and the switch 60 are all mounted within an instrument casing designated at 82. Mounted on the instrument casing 82, adjacent and above the switch 60, is a leaf spring 83 which is adapted for engagement and movement by an adjustable screw 84 which, in turn, is mounted on a lever 85 pivoted at 86. In order to move the switch 60 to its standardizing position, the lever 85 is moved in a counter-clockwise direction to bring the leaf spring 83 into engagement with the common operating member 65 of the switch 60. Such counter-clockwise motion of the lever 85 is accomplished by engagement between a pin 87 and a cam surface 88 that is formed on a shaft 89 on one end of which the knob 43 is mounted. The shaft 89 is journalled for axial and rotative movement in the instrument casing 82 in suitable bearings. Shaft 89 may be rotated and moved axially by means of knob 43, and, in standardizing the instrument, the knob 43 is positioned to the left as seen in Fig. 3 to move common operating member 65 of the switch 60 downwardly, thereby to effect adjustment of the switch 60 into its standardizing position. Continued motion of the knob 43 to the left operates to bring a clutch plate 90 into engagement with a second clutch plate 91, which latter clutch plate is rigidly mounted on the end of shaft 81 of the rheostat 38. After the clutch plates 90 and 91 have engaged, the knob 43 may be rotated to adjust the amount of the resistors 39 and 40 which are connected in the potentiometric branch in series with the battery 37.

As shown in Fig. 2, the rotor of the motor M operates a pinion 92 which drives a gear 93. The gear 93 carries a gear 94 and a cable drum 95. The cable 49 which drives the slidewire contact 50 of the slidewire assembly 30 is fastened to the cable drum 95 and passes over a tension pulley 96 carried by a lever 97 pivoted at 98 and urged downwardly by a spring 99. The cable also passes over pulleys 100 and 101 and passes over the cable drum 48. The gear 94 operates a gear sector 102 which in turn operates a pen arm 103 for recording the temperature variations within the furnace 25 on a chart 104 and also positions an arm 105 for controlling the air operated device 33. The chart 104 is arranged to be rotated at a constant speed by the chart drive motor 106 through suitable mechanism not shown.

The arm 105 operates a flapper mechanism 107 carried by the body portion 108 of the air operated device 33. The device 33 is equipped with dials 109 and 110 for adjusting the throttling range and the rate of reset of the control device. Air under pressure is supplied through a pipe 111 to a pneumatic relay mechanism 112, and the air pressure in a pipe 113, controlled by the control device 33, regulates a pilot valve contained in the relay mechanism 112 to produce a pressure in the pipe 114 in accordance with the temperature within the furnace 25. The pressure in the pipe 114 is conducted by a pipe 115 to the pneumatic motor 26 which operates the valve 27, and the pressure in the pipe 114 is also connected through a pipe 116 to the control device 33 in order to provide desired follow-up and reset operations in the control device 33.

Upon an increase in temperature within the furnace 25, motor M is operated in the counter-clockwise direction to drive the gear 93 in a clockwise direction. Rotation of the gear 93 in the clockwise direction causes the contact 50 of the slidewire assembly 30 to rotate in a clockwise direction to rebalance the potentiometric network 29. Clockwise rotation of the gear 93 also causes the gear sector 102 and the pen 103 to rotate in a counter-clockwise direction to record on the chart 104 the increase in temperature which has occurred within the furnace 25. Counter-clockwise rotation of the gear 102 also operates through the arm 105 and flapper assembly 107 to actuate the control device 33 to position the relay mechanism 112 to decrease the pressure transmitted to the pneumatic motor 26 of the valve 27. This moves the valve 27 towards its closed position to decrease the supply of fuel to the furnace 25 for the purpose of reducing the temperature of the furnace to the desired, normal value. The decrease in pressure transmitted to the valve motor 26 is also transmitted to the control device 33 to provide a follow-up action for causing the valve 27 to be positioned in accordance with temperature value within the furnace. This decrease in pressure transmitted to the control device 33 operates through the reset mechanism thereof to position additionally the valve 27 towards a closed position if the temperature increase within the furnace extends over a substantial period of time.

Upon a decrease in temperature within the furnace 25, the opposite action takes place. Specifically, the slidewire contact 50 is moved in a counter-clockwise direction, the pen arm 103 is moved in a clockwise direction to a lower temperature value along the chart 104, and the control device 33 is actuated to cause a proportionate opening of the valve 27 to increase the supply of fuel to the furnace 25, restoring the furnace temperature to the desired value.

In accordance with the present invention, the need for adjustment of the rheostat 38 by the knob 43 is indicated by a deflection of the indicating element of the milliammeter 23 from its normal undeflected position when the switch 60 is in the standardizing position. The direction of deflection from normal of the milliammeter indicating element indicates whether the portion of the resistors 39 and 40 included in the potentiometric branch with the battery 37 should be increased or decreased. With this arrangement, therefore, the standardizing or recalibrating adjustment which is required may quickly and easily be made by manipulation of the knob 43. Moreover, in making such adjustment, it is not necessary to observe the operation of the potentiometric rebalancing motor, nor the mechanism operated thereby, as in the prior art as disclosed in the aforementioned Wills patent, for example. This feature of my invention is of especial importance in certain control applications, as will become apparent from the following explanation, in that the potentiometric rebalancing motor M may temporarily be made inoperative during the standardizing adjustments, whereby any tendency for false adjustments of the fuel control valve 27 to be made during the standardizing operations is eliminated. This tendency has existed in the prior art apparatus, as disclosed in the aforementioned Wills patent, for example, and has created difficulties making that appaartus unsuitable for certain control applications.

In explanation of this difficulty with the prior art apparatus, and on the assumption that a substantial change occurs in the voltage of the battery 37 and that the rebalancing motor M is operatively connected to the output circuit of the electronic device 31 during the standardizing adjustments, the adjustment of the switch 60 to its standardizing position may cause rotation of the motor M of a magnitude sufficient to effect rapid movement of the final control valve 27 to its fully opened or closed positions. Thereafter, upon adjustment of switch 69 to its normal running position, the final control valve 27 will rapidly be returned to a position near that occupied prior to the standardizing adjustment. Such rapid and wide adjustments of the valve 27 permit rapid changes in the flow of fuel through the nozzle 26 into the hot interior of the furnace 25 and are effective to cause the fuel to be ignited with more or less explosive violence. In the case in which the furnace 25 is protected by a flame failure device or other type of safety device, such an explosion might cause the furnace 25 to be shut down with attendant difficulties in restarting.

Such explosions and attendant difficulties are prevented in accordance with the present invention by rendering the potentiometric rebalancing motor M temporarily inoperative during the standardizing adjustments so that no false adjustments in the position of the fuel valve 27 can be effected as a result of the standardizing operation. As shown in Fig. 2, the mechanism by which the motor M is made inoperative during the standardizing adjustments includes the standardizing switch contacts 71 and 78 which engage in the standardizing position of the switch 60 to shunt the power winding 15 of the motor and thus deenergize the motor for rotation. Deenergization of the motor M for rotation in this manner does not interfere with the operation of the electronic device 31, nor with the operation of the milliammeter instrument 23 for indicating the state of balance of the standardizing portion of the potentiometric network 29. Accordingly, the standardizing adjustment needed may be made and the apparatus restored to its normal running condition without producing any false adjustments of the fuel valve 27.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a motor control apparatus of the type comprising a pair of motor drive valves, each of which has an anode, a cathode, and a control grid, and an output circuit including the anode and the cathode of the valve, the output circuits of the two valves including separate current supply connections to the anodes of the two valves and a common current supply connection to the cathodes of the two valves, a motor, motor energizing circuit means connected to the output circuits of said valves for operation of said motor in one direction or in the opposite direction when the anode current of one of said valves is respectively larger or smaller than the anode current of the other valve, and means for applying a control signal to the control grids of the two valves to make one valve more or less conductive than the other when the value of the control signal differs in one sense or in the opposite sense from the normal value thereof, the improvement comprising a pair of series connected resistors between each of the cathodes of the two valves and said common current supply connection, and a voltage responsive device connected between the adjacent ends of the resistors of one pair and the adjacent ends of the resistors of the other pair.

2. A motor control apparatus as specified in claim 1, including a separate capacitor connected in parallel to each of said resistors adjacent said common current supply connection.

3. A motor control apparatus as specified in claim 1, in which the resistors of each pair adjacent said common current supply connection have approximately the same resistance, and in which at least one of the other two resistors is adjustable to permit variation in its resistance.

4. A motor control apparatus as specified in claim 1, in which the resistors of each pair adjacent said common current supply connection have approximately the same resistance, in which at least one of the other two resistors is adjustable to permit variation in its resistance to compensate for such differences in the conductivities of said valves as may exist with a zero control signal applied to the control grids thereof, and including a separate capacitor connected in parallel to each of said resistors adjacent said common current supply connection.

5. In a motor control apparatus of the type comprising a pair of motor drive valves, each of which has an anode, a cathode, and a control grid, and an output circuit including the anode and the cathode of the valve, the output circuits of the two valves including separate current supply connections to the anodes of the two valves and a common current supply connection to the cathodes of the two valves, a motor having a power winding and a control winding, a current supply connection to said power winding including a capacitor connected in series with said power winding, means connecting said motor control winding to the output circuits of said valves for operation of said motor in one direction or in the opposite direction when the anode current of one of said valves is respectively larger or smaller than the anode current of the other valve, and means for applying a control signal to the control grids of the two valves to make one valve more or less conductive than the other when the value of the control signal differs in one sense or in the opposite sense from the normal value thereof, the improvement comprising a pair of series connected resistors between each of the cathodes of the two valves and said common current supply connection, a voltage responsive device connected between the adjacent ends of the resistors of one pair and the adjacent ends of the resistors of the other pair to indicate the state of conduction of said valves, and means independent of the state of conduction of said valves to deenergize said motor for rotation.

6. A motor control apparatus as specified in claim 5, in which said last mentioned means comprises a low resistance connection including a switch therein to shunt said motor power winding upon closure of said switch.

7. In a motor control apparatus of the type comprising a pair of motor drive valves, each of which has an anode, a cathode, and a control grid, and an output circuit including the anode and the cathode of the valve, the output circuits of the two valves including separate current supply connections to the anodes of the two valves and a common current supply connection to the cathodes of the two valves, a motor having a power winding and a control winding, a current supply connection to said power winding including a capacitor connected in series with said power winding, means connecting said control winding to the output circuits of said valves for operation of said motor in one direction or in the opposite direction when the anode current of one of said valves is respectively larger or smaller than the anode current of the other valve, and means for applying a control signal to the control grids of the two valves and operating to make one valve more or less conductive than the other when the value of the control signal differs in one sense or in the opposite sense from the normal value thereof, the improvement comprising a pair of series connected resistors between each of the cathodes of the two valves and said common current supply connection, the resistors of each pair adjacent said common current supply connection having approximately the same resistance and at least one of the other resistors being adjustable to permit variation in its resistance to compensate for such differences in the conductivities of said valves as may exist with a zero control signal applied to the control grids thereof, a separate capacitor connected in parallel to each of said resistors adjacent said common current supply connection, a voltage responsive device connected between the adjacent ends of the resistors of one pair and the adjacent ends of the resistors of the other pair to indicate the state of conduction of said valves, and means independent of the state of conduction of said valves to deenergize said motor for rotation.

8. In a self-balancing potentiometer instrument, the combination of, a potentiometer circuit including a pair of terminals on which a unidirectional electromotive force to be measured is adapted to be impressed, a source of known uni-directional electromotive force for producing a uni-directional electromotive force in opposition to the uni-directional electromotive force impressed on said terminals, a slide-wire for variably opposing the source of known uni-directional electromotive force to the electromotive force impressed on said terminals, an electronic amplifier having an input circuit controlled by the potentiometer circuit and having an output circuit in which a control voltage differing in one sense or in the opposite sense from a normal value thereof is adapted to be produced in accordance with the state of balance of said potentiometer circuit, a pair of motor drive valves, each of which has an anode, a cathode, and a control grid, and an output circuit including the anode and the cathode of the valve, the output circuits of the two valves including separate current supply connections to the anodes of the two valves and a common current supply connection to the cathodes of the two valves, a motor for operating said slide-wire, motor energizing circuit means connected to the output circuits of said valves for operation of said motor in one direction or in the opposite direction when the anode current of one of said valves is respectively larger or smaller than the anode current of the other valve, a connection from the output circuit of said electronic amplifier to the control grids of the two valves and operating to make one valve more or less conductive than the other when the value of the control voltage differs in one sense or in the opposite sense from the normal value thereof, a pair of series connected resistors between each of the cathodes of the two valves and said common current supply connection, a voltage responsive device connected between the adjacent ends of the resistors of one pair and the adjacent ends of the resistors of the other pair to indicate the state of conduction of said valves, a standard cell for producing a standard uni-directional electromotive force, standardizing switch means for opposing the source of known electromotive force to the electromotive force produced by the standard cell in lieu of the electromotive force impressed on said terminals to check the known electromotive force, and means operated by said switch means to deenergize said motor for rotation when the standard electromotive force is opposed to the known electromotive force.

9. In a self-balancing potentiometer instrument comprising a potentiometer circuit including a pair of terminals on which a uni-directional electromotive force to be measured is adapted to be impressed, a source of known uni-directional electromotive force for producing a uni-directional electromotive force in opposition to the uni-directional electromotive force impressed on said terminals, a slide-wire for variably opposing the source of known uni-directional electromotive force to the electromotive force impressed on said terminals, an electronic amplifier having an input circuit controlled by the potentiometer circuit and having an output circuit in which a control voltage differing in one sense or in the opposite sense from a normal value thereof is adapted to be produced in accordance with the state of balance of said potentiometer circuit, a pair of motor drive valves, each of which has an anode, a cathode, and a control grid, and an output circuit including the anode and the cathode of the valve, the output circuits of the two valves including separate current supply connections to the anodes of the two valves and a common current supply connection to the cathodes of the two valves, a motor for operating said slide-wire and having a power winding and a control winding, a current supply connection to said power winding including a capacitor connected in series with said power winding, means connecting said control winding to the output circuits of said valves for operation of said motor in one direction or in the opposite direction when the anode current of one of said valves is respectively larger or smaller than the anode current of the other valve, and a connection from the output circuit of said electronic amplifier to the control grids of the two valves and operating to make one valve more or less conductive than the other when the value of the control voltage differs in one sense or in the opposite sense from the normal value thereof, the improvement comprising a pair of series connected resistors between each of the cathodes of the two valves and said common current supply connection, the resistors of each pair adjacent said common current supply connection having approximately the same resistance and at least one of the other resistors being adjustable to permit variation in its resistance to compensate for such differences in the conductivities of said valves as may exist with a zero control signal applied to the control grids thereof, a separate capacitor connected in parallel to each of said resistors adjacent said common current supply connection, a voltage responsive device connected between the adjacent ends of the resistors of one pair and the adjacent ends of the resistors of the other pair to indicate the state of conduction of said valves, a standard cell for producing a standard uni-directional electromotive force, standardizing switch means for opposing the electromotive force produced by the source of known electromotive force to the electromotive force produced by the standard cell in lieu of the electromotive force impressed on said terminals to check the known electromotive force, and means operated by said switch means to deenergize said motor for rotation when the standard electromotive force is opposed to the known electromotive force.

10. A self-balancing potentiometer instrument as specified in claim 9, in which the said last mentioned means comprises a low resistance connection including a switch therein to shunt said motor power winding upon closure of said switch, said switch being adjusted to its closed position when said switch means opposes the standard electromotive force to the source of known electromotive force.

11. In an electric self-balancing potentiometric instrument having a circuit for standardizing said potentiometric instrument by connecting it to a standard cell by means of a standardizing switch, an electric rebalancing motor having a power winding and a control winding, leads adapted to connect said power winding to a source of electricity, leads adapted to connect said control winding to receive a controlling signal therethrough, a condenser connected in one of said power-winding leads to vary the phase of the electricity conducted therethrough, an electric switch adapted when closed to be connected across said power-winding leads in parallel with said power-winding and thereby to prevent motion of said rebalancing motor, and an operator for simultaneously moving the standardizing switch of the potentiometric instrument to standardizing position and for closing said power-winding paralleling switch.

12. A self-balancing potentiometric instrument as specified in claim 11 including standardizing mechanism to recalibrate the potentiometric instrument, and an electric meter connected to said potentiometric instrument to indicate the state of balance of said potentiometric instrument.

ARTHUR E. GEALT.

REFERENCES CITED

The following references are of record in the file of this patent:

UNITED STATES PATENTS

| Number | Name | Date |
|---|---|---|
| 2,334,704 | Hilferty | Nov. 23, 1943 |
| 2,446,153 | Belcher | July 27, 1948 |
| 2,464,818 | Learned | Mar. 22, 1949 |

OTHER REFERENCES

"A Continuous-Control Servo System"; by J. T. McNaney, pp. 118–125, Electronics, December 1944.